May 5, 1959  K. HILDEBRAND  2,884,830
SIGHTING DEVICE FOR ELECTRO-OPTICAL DISTANCE METERS
Filed Nov. 21, 1956

INVENTOR
Klaus Hildebrand
BY
F. D. Prager
ATTORNEY

United States Patent Office 2,884,830
Patented May 5, 1959

2,884,830

SIGHTING DEVICE FOR ELECTRO-OPTICAL DISTANCE METERS

Klaus Hildebrand, Berlin-Neukoelln, Germany, assignor to Askania-Werke A.G., Berlin-Friedenau, Germany, a corporation of Germany Application November 21, 1956, Serial No. 623,572

Claims priority, application Germany December 2, 1955

2 Claims. (Cl. 88—1)

This invention relates to a sighting device for that kind of distance meter wherein the distance to be measured is traversed by a signal of optical wave energy—hereinafter broadly called a light signal—a characteristic of which is then electrically determined. Such measurement has been effected for instance by crossed Nicols with an intermediate Kerr cell or the like, amplitude modulating the light of a transmitting light source and cooperating with circuitry comprising the Kerr cell and a photosensitive receiver whereby a phase shift in the modulated light signals can be measured, after reflection of said signals at the end of the distance to be measured and reception of the reflected signals in the receiver.

In such a system a plurality of optical elements must be aligned with a principal optical axis, or in other words, such an axis must be established through a plurality of elements, while adjustments and readjustments, either intentional or unintentional, must be considered for several or all of the elements. It is the object of this invention to facilitate the somewhat complex sighting involved in the use of such a system.

Figure 1:
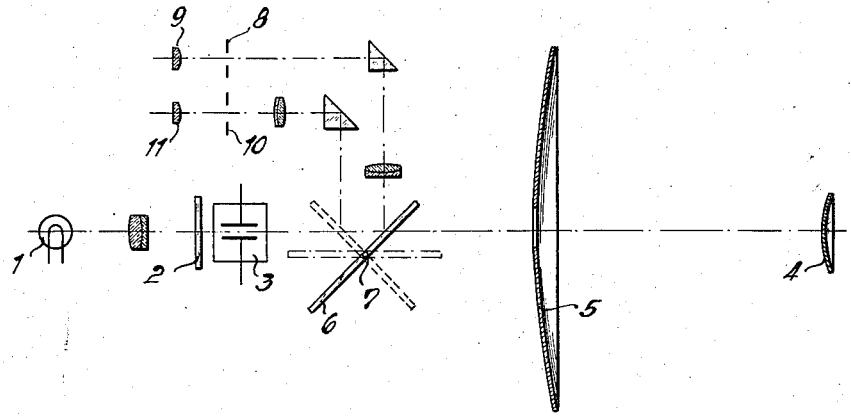
Figure 2:
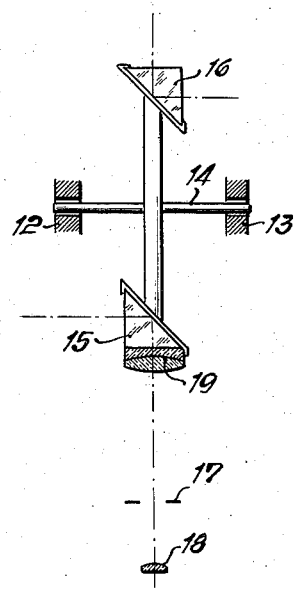
Figure 3:
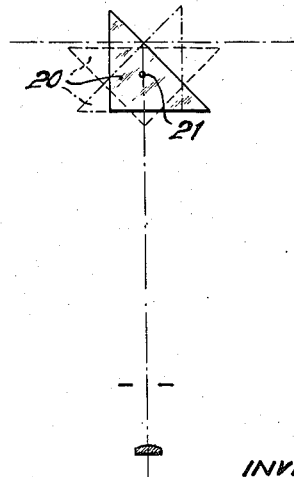

The manner in which this has been achieved with precision as well as with simplicity and economy will be noted most readily from the detailed disclosure which follows, in conjunction with the drawing, wherein Figure 1 is a schematic diagram of a transmitter forming part of a system as mentioned; and Figures 2 and 3 are modified details of such a diagram.

The light from source 1 passes, as a fine beam, through a polarizer or Nicol 2 and through a polarization modulator such as a Kerr cell 3. The beam then passes over a transmitting objective, comprising for instance curved mirrors 4, 5, toward a remote target such as a reflector, not shown, which is installed at the far end of the unknown distance to be measured. From the remote reflector the light may pass further on to a receiver, not shown herein, which usually comprises a second objective, a polarization analyzer and a photocell.

Several sight adjusting operations are required for the proper use of the transmitter shown. It is particularly important that the system comprising the light source 1 and the Kerr cell 3 be placed exactly in the optical axis of the objective 4, 5, while not only the objective must be adjustable but in addition and separately, mechanical adjustments are either desired or required as to part or all said system; see for instance the present inventor's copending application Serial No. 623,571, filed on November 21, 1956 and entitled, "Method and Device for Electro-Optical Distance Measurement." In addition it is necessary that the objective 4, 5 be directed precisely toward the remote target. It will be understood, for instance from said copending application, that the distance measurement presupposes an accurate sight adjustment, directing the light from source 1 onto the remote target. This requires, placing both the light source subassembly 1, 2, 3 and the remote target exactly into the optical axis of objective 4, 5.

These adjusting operations are readily as well as precisely performed, in accordance with the present invention, by added reflector means or equivalent apparatus adapted to deflect the principal axis of the transmitter and thereby to create, laterally of said axis, images of the remote target and of the light source which can be compared with and shifted relative to suitable symbols in the focal planes of ocular means for observing such images; it being easy thereafter to remove any disturbance caused by the reflector or equivalent means and thus to insure precise transmission of light signals in the normal use of the instrument.

In Figure 1 a small planar mirror 6 is shown as being rotatable about an axis 7 disposed laterally of the principal axis of the transmitter and at right angles thereto; said principal axis being indicated by a fine dash-dot line. In the position shown in full lines, the mirror 6 allows observation of light source 1 in the focal plane 8 of an ocular 9, said plane being lateral of said axis of objective 4, 5 and containing a suitable mark or symbol, not shown, to allow proper adjustment or readjustment of the position of the light source relative to the principal axis. A second position of mirror 6 is shown in broken lines and is arranged at right angles to the position described above, in order to allow observation of the remote target in the focal plane 10 of a second ocular 11, and thus to allow adjustment and readjustment of the objective 4, 5. A third position of mirror 6 is shown in dash-dot lines; here the mirror is withdrawn from the principal axis, for the performance of the distance measurement by the signals from 1.

It will be clear from the foregoing description, together with the aforementioned copending application, that the operation of the instrument begins with adjustment operations and then proceeds with the actual distance measurement. The preliminary adjustment according to the present invention involves, successively observing the position of light source 1 in focal plane 8 of ocular 9, with mirror 6 in the full line position, and observing the position of the remote target relative to focal plane 10 of ocular 11 with the mirror in the opposite position. Thereafter the actual measurement of the distance from source 1 to the target can proceed by operations which require no detailed description herein, except that during such measurement the mirror 6 should be in the third or intermediate position.

Instead of the two oculars 9, 11, Figure 2 shows a single ocular for sighting both objects, the source and the target. Bearing means 12, 13 here support an axle 14 with a balanced cross beam thereon, the equidistant ends of which support two prisms 15, 16. The hypotenuse surfaces of these prisms are mirrorized and they are arranged opposite one another so that either of them can be inserted across the principal axis, again shown by a fine dash-dot line. In this case the axis can be angularly broken at a single point and passed through a single focal plane 17 and ocular 18. Precise imaging of both objects remains possible, particularly by means of a lens 19 cemented to one of the sides of one of the reflecting prisms 15.

A further simplification is schematically shown in Figure 3. Here a single reflecting prism 20 is used, which can be swung about a pivot 21. In the full line position of this prism, the light source is seen; in the dash-dot line position, the remote target, with a single ocular as in Figure 2. In the broken-line position, the distance measurement is performed.

I claim:

1. In an electro-optical instrument: a light source; means for cyclically modulating light from the source; an objective for transmitting modulated light to a remote target; movable reflector means; means for moving the reflector means into any of three positions, including a first position in which a surface of the reflector means obliquely faces the light source, between the source and the objective, a second position in which a surface of the reflector means obliquely faces the objective, between the source and the objective, and a third position in which the reflector means is withdrawn from between the source and the objective, for said transmitting of modulated light; ocular means for observing, by means of the reflector means in the first and second positions of that means, the exact position of the light source and, through the objective, the exact position of the target; and reference means in the focal plane of the ocular means for comparing the observed exact positions of the light source and of the target with reference positions thereof.

2. An instrument as described in claim 1 wherein the ocular means comprises a single lens unit, facing substantially identical reflector surface points when the reflector means is in the first and second positions.

References Cited in the file of this patent
UNITED STATES PATENTS

| | | |
|---|---|---|
| 578,459 | Leuner | Mar. 9, 1897 |
| 1,290,744 | Hollander | Jan. 7, 1919 |
| 1,386,666 | Wickersham | Aug. 9, 1921 |
| 1,505,878 | Erfle | Aug. 19, 1924 |
| 1,712,112 | Keuffel | May 7, 1929 |
| 1,893,158 | Chireix et al. | Jan. 3, 1933 |
| 2,153,709 | Bournisien | Apr. 11, 1939 |
| 2,234,329 | Woeff | Mar. 11, 1941 |
| 2,490,899 | Cohen | Dec. 13, 1949 |